(12) United States Patent
Babar

(10) Patent No.: US 10,223,659 B2
(45) Date of Patent: Mar. 5, 2019

(54) METHODS AND SYSTEM FOR INTEGRATING SOCIAL MEDIA ANALYSIS INTO AN ENTERPRISE PROJECT MANAGEMENT SYSTEM

(71) Applicant: ORACLE INTERNATIONAL CORPORATION, Redwood Shores, CA (US)

(72) Inventor: Yash Babar, Indore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 873 days.

(21) Appl. No.: 14/621,159

(22) Filed: Feb. 12, 2015

(65) Prior Publication Data

US 2016/0239774 A1   Aug. 18, 2016

(51) Int. Cl.
*G06Q 10/06* (2012.01)
*G06F 17/27* (2006.01)
*G06Q 50/00* (2012.01)

(52) U.S. Cl.
CPC ..... *G06Q 10/0637* (2013.01); *G06F 17/2785* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 6,651,034 B1* | 11/2003 | Hedlund | B60L 3/12 701/32.1 |
| 2002/0091817 A1* | 7/2002 | Hill | G06F 11/3419 709/224 |
| 2014/0164398 A1* | 6/2014 | Smith | G06F 17/3053 707/748 |
| 2014/0317118 A1* | 10/2014 | Bao | G06Q 10/06 707/738 |

* cited by examiner

*Primary Examiner* — Eric W Stamber
*Assistant Examiner* — Alan Torrico-Lopez
(74) *Attorney, Agent, or Firm* — Vista IP Law Group, LLP

(57) ABSTRACT

Disclosed is an approach for analyzing social media conversations related to one or more projects of an enterprise project management system. Integration is provided between a PPM application and an enterprise social networking application. Conversations generated around one or more social objects pertaining to one or more projects of the enterprise project management system are analyzed to estimate a social health of the project on the enterprise social network. The estimated social health is integrated back into the PPM application.

19 Claims, 12 Drawing Sheets

METHODS AND SYSTEM FOR INTEGRATING SOCIAL MEDIA ANALYSIS INTO AN ENTERPRISE PROJECT MANAGEMENT SYSTEM

BACKGROUND

Many businesses and organizations employ one or more business applications, and in some cases, suites of business applications, to provide visibility and control over various aspects of the business. Such "business applications" (or, as they are sometimes called, "enterprise applications") can include, without limitation, portfolio project management ("PPM") applications, customer relations management ("CRM") applications, human capital management ("HCM") applications, and other applications dealing with various finance, accounting, manufacturing, and/or distribution functions, which can be recognized as an embodiment of an enterprise resource planning ("ERP") system. Exemplary enterprise application suites include, without limitation, Oracle Fusion, Oracle eBusiness Suite and JD Edwards Enterprise One, all of which are available from Oracle Corporation of Redwood Shores, Calif.

For many of these enterprise/business applications, it would be very useful to be able to provide an effective mechanism to allow users of the system to interact and collaborate with each other. For example, many business applications offer social tools like Yammer (Microsoft Enterprise Project Management) and Chatter (Salesforce) and other social tools like Oracle Social Network. These social tools help track inputs, comments and help members of the enterprise communicate meaningfully on various project-related tasks.

Specifically in the context of project management systems such as the Oracle PPM system, it might be very helpful to understand the pulse and direction of past, current and future projects through the nature of social interaction regarding these projects on social networking sites. This may provide project managers visibility into a project's progress, excitement for the project, difficulties in the project, and other such metrics prior to the availability of traditional quantifiable metrics for the project (e.g., revenue, completion date, etc.). In this type of integrated system, social network data can be mined specifically for the use of project management system to gain valuable insights on ongoing projects of an enterprise.

SUMMARY

The present disclosure is directed to an approach for integrating one or more enterprise applications with a social networking application. According to some embodiments, a method of predicting social health of a project comprises creating a social object corresponding to a project associated with an enterprise project management application at an enterprise social network, tracking a set of social media conversations associated with the created social object, analyzing the set of social media conversations to estimate a social health of the project and providing the estimate social health at the enterprise project management application.

Other and additional objects, features, and advantages of the invention are described in the detailed description, figures, and claims.

DETAILED DESCRIPTION

Figure 1:
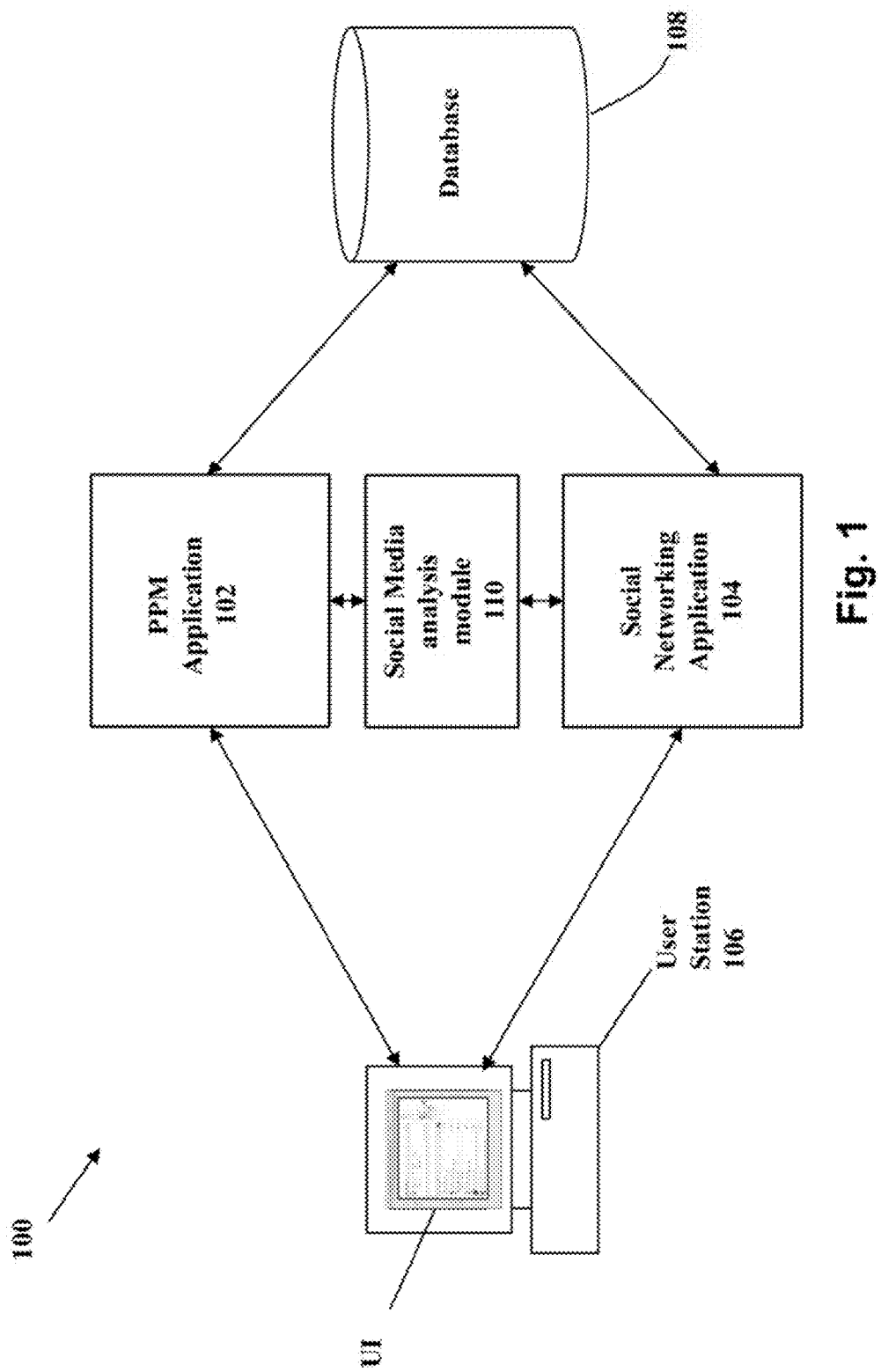
FIG. 1 depicts an example system of providing a social health of a project through integration between an enterprise project management application and a social networking application.

The present disclosure is directed to analyzing social media data and integrating the social media analysis into an enterprise project management system. According to some embodiments, integration is provided between a PPM application and the social networking application. Specifically, data from the social networking application is mined and analyzed and integrated into the PPM application. This approach advantageously provides real-time visibility into social network metrics that can be used to gauge a progress of one or more projects in a project portfolio.

Various embodiments are described hereinafter with reference to the figures. It should be noted that the figures are not drawn to scale and that the elements of similar structures or functions are represented by like reference numerals throughout the figures. It should be noted that the figures are only intended to facilitate the description of the embodiments. They are not intended as an exhaustive description of the invention or as a limitation on the scope of the invention. In addition, an illustrative embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in embodiments" in various places throughout this specification are not necessarily referring to the same embodiment or embodiments.

According to some embodiments, integration is provided between a project portfolio management ("PPM") application and the social networking application. For the purposes of explanation, one or more embodiments are illustratively described with reference to PPM applications. It is noted, however, that the invention may be applied to other types of enterprise applications as well, and is not to be limited to PPM applications unless explicitly claimed as such.

FIG. 1 illustrates an example system 100 which may be employed in some embodiments of the invention to implement integration of a PPM application 102 and a social networking application 104. The system 100 includes one or more users at one or more user stations 106 that operate the system 100 to operate the PPM application 102, the social networking application 104, and/or an integrated version of the two applications. The user station 102 comprises any type of computing station that may be used to operate or interface with the applications in the system 100. Examples of such user stations 102 include for example, workstations, personal computers, mobile phones, smartphones, tablets or remote computing terminals. The user station 102 comprises a display device, such as a display monitor, for displaying a user interface to users at the user station 102. The user station also comprises one or more input devices for the user to provide operational control over the activities of the system, such as a mouse or keyboard to manipulate a pointing object in a graphical user interface to generate user inputs to the PPM application 102 and/or social networking application 104.

The data operated upon by the PPM application 102 and/or social networking application 104 may be stored in a computer readable storage device 108. The computer readable storage device 108 comprises any combination of hardware and software that allows for ready access to the data that is located at the computer readable storage device. For example, the computer readable storage device 108 could be implemented as computer memory operatively managed by an operating system. The computer readable storage device 108 could also be implemented as an electronic database system having storage on persistent and/or non-persistent storage. The computer readable storage device 108 may be shared as shown in FIG. 1 or on discrete servers that are not shared between the PPM application and the social networking application.

The social networking application 104 comprises an application for implementing social networking services and functionality. The social networking application in the present embodiment facilitates social interactions within the enterprise environment (as opposed to a social networking/media application in the consumer environment) connecting people, applications and business processes within and across businesses. In the context of project management systems, projects may have stakeholders (e.g., clients, entities external to the organization, etc.). In one or more embodiments these external entities may also be allowed complete or partial access to social conversations on the social network. The social network includes user profiles, conversations, and social objects.

A "conversation" in the social network in one embodiment is a persistent, shared stream of posts and comments (i.e., messages) including, for example, text, rich-text, documents, audio, video, programmatic content (referred to as "gadgets"), etc. A conversation has a defined membership ranging from "Private" (i.e., membership of one/self), through N-members consisting of individuals and or groups of individuals or sub-groups, to "Public" with visibility open across all members of social network. Posts within a conversation are viewed with new posts beneath old posts (i.e., multiple posts can be read as text on a page in a book), or vice versa, or in any type of hierarchical format.

The social media analysis module 110 comprises an intermediary module between the PPM and the social network in one or more embodiments. The social media analysis module 110 may be configured to mine one or more social conversations, or social objects through a variety of analysis techniques (as will be described in detail further below) and estimate a sentiment of the social conversation(s) around one or more projects of interest. The social media analysis module 110 may be configured to take into account both the content and the metadata related to social objects on the social network to analyze the overall sentiment (e.g., positive, negative, neutral, urgent, slow-paced, etc.) of the conversations relating to the projects of interest. Although FIG. 1 illustrates the social media analysis module 110 as an intermediary module, it should be appreciated that other embodiments may take an integrated approach such that the social media analysis module is part of the PPM or the social network.

In one or more embodiments, the social media analysis module 110 feeds into the PPM application, such that the users interacting with the PPM application through the user station 106 are able to view the overall social health as gauged from social media sentiment around one or more projects. It should be appreciated that the social health may be estimated even prior to receiving tangible results or standard metrics for those projects.

For the purposes of illustration, the following explanation is being made in the context of a specific social networking application (the "Oracle Social Network" or "OSN"). It is noted however, that the invention is not limited to this specific social networking application, and is applicable to other social networking applications as well. Therefore, any reference to "OSN" or "Oracle Social Network" made herein is merely illustrative of a social network that may be employed in conjunction with some embodiments of the invention. Information regarding an example social network implementation that may be used in conjunction with the present invention is described in co-pending U.S. application Ser. No. 13/622,071, filed on Sep. 20, 2012, entitled "Social Network System with Social Objects", which is hereby incorporated by reference in its entirety.

In some embodiments, the social networking application comprises a secure enterprise collaboration and social networking solution for business purposes. The social networking application facilitates real-time collaboration between individuals and teams within and across enterprises with a broad range of social tools that seamlessly integrate business processes, activities, and enterprise. With the integration of the social networking application and enterprise applications, users are able to stay informed of business activities and drive productivity with purposeful social networking.

Social objects are data objects that are shared between the social network and the PPM/enterprise application to provide integration between these two applications. The social objects include sufficient information that can usefully permit one application to work with the other. For example, the details pertaining to a project management business object within the PPM application may be passed as a social object to the social networking application so that the tools within the social networking application (e.g., conversation tool) can display and act upon the PPM information.

For example, a particular project on the PPM application may be integrated as a social object on the social network. Or, in another embodiment, various tasks of the projects may be represented as their own social objects on the social network. Any suitable type of social object may be integrated using the present mechanism/process. For example, people interaction may be implemented and/or facilitated through the social object's data exposed through the social network. Process details (e.g., PPM, Business Process Management or BPM), people interaction, sales, and/or key performance indicators ("KPI") definition or thresholds are examples of data that may be provided using the social objects.

In addition, data exposed by the social object should be useful and/or valuable for multiple users (e.g., all users or at least a set of users). Examples of such useful information include project deadlines, project completion status, project tasks, project challenges, etc. Other project related information may also be helpful when presented as social objects to multiple users of the social network.

The integration of the social objects may provide numerous benefits to the user/company. For example, this approach allows for sharing of useful information/data. In addition, this permits a single space of collaboration for a given topics. Moreover, this approach simplifies and enhances people communication. Allowing social analysis data to be fed back into the PPM system and PPM data to be represented as social objects on the social network advantageously allows users of the enterprise to have meaningful communications about their ongoing projects with their peers. Similarly, providing visibility of the nature, sentiment, frequency and vibe of the social conversation (i.e., in order to estimate a social health) around one or more projects may prove to be very beneficial for project management purposes.

Figure 2:
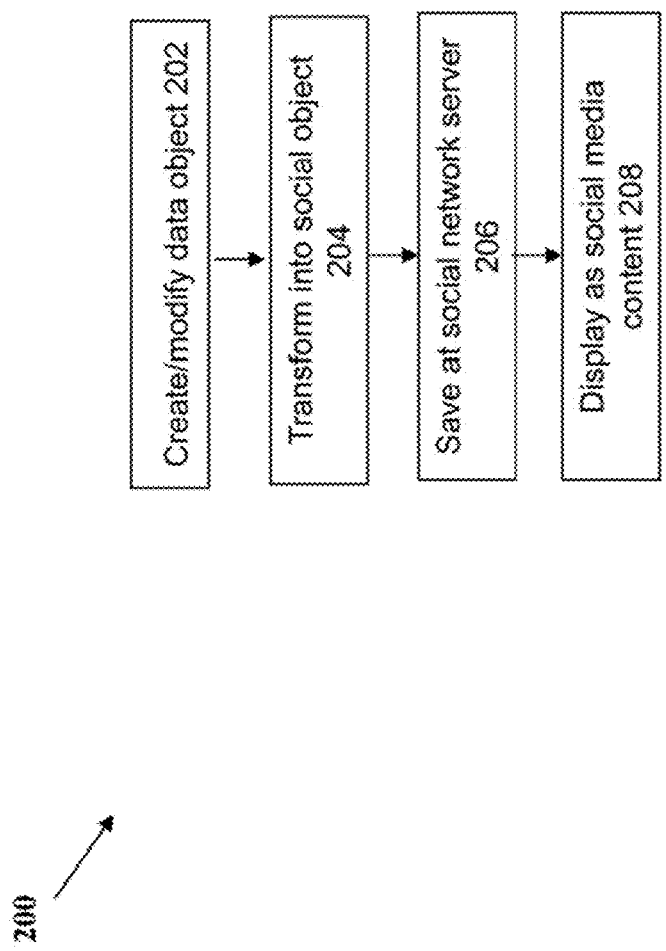
FIG. 2 depicts an example flowchart to integrate an enterprise project management application with a social networking application.

FIG. 2 shows a flowchart of an approach to integrate an enterprise application with a social network application. Although the remaining application disclosure will focus on retrieving social media analysis from the social network and populating the data at the PPM, it should be appreciated that this approach requires a two-way communication between the social network and the enterprise application. Enterprise objects are integrated into the social network through a connector, as will be briefly described in FIG. 2, and similarly, data from the social network is analyzed, and integrated at the PPM system as will be described further below.

The process of integrating enterprise application objects into the social network is briefly described in FIG. 2. At 202, a data object is created and/or modified in the enterprise application system (illustratively referred to herein with respect to a PPM system). Such objects may pertain to any data or information to be maintained in the PPM system. Examples of such objects comprise data pertaining to a project portfolio and/or project specifications. In some embodiments, the PPM data object corresponds to a project-related object and an associated system of record.

At 204, the PPM data object is transformed into a data object usable by a social network system. Any data from enterprise applications and business processes can potentially be socialized as a "social object." Social objects contain records from a business application or process (referred to as a "system of record") that are mapped as a visual and programmatic integration into the social network. For example, a project record from within a PPM enterprise application (e.g., the name of a project portfolio and related data for the sales prospect, such as the estimated probability that it will be completed, projected revenue from the project, etc.) is integrated into social network as a social object. As a result, social objects are explicitly coupled with conversations, where the social object can be discussed in context, and a record of that discussion can be retained for future viewing.

The social object may be generated for any business object of an application that users may desire to collaborate on over the social network. Examples of social objects include (1) an "Project name" social object from a PPM application; (2) a "Project timeline" social object from a PPM application; (3) a "Project specification" social object from a PPM application; (4) a "Business Process Shipment Escalation" social object from a business process application; (5) a "Portal" subject social object from a web portal application; (6) an "Inventory Item" social object from an inventory/ERP application; and (7) an "Ordered Product" social object from a distributed order orchestration application (e.g., "Fusion Distributed Order Orchestration (DOO)" application from Oracle Corp.). Similarly, any other type or form of social objects may be similarly created and integrated into the social network.

At 206, the social objects are stored within a social network system. At 210, then social objects are then displayed and/or acted upon as social network content within the social network system.

In some embodiments, a social object in social network pertains to one or more the following: (a) a set of programmatic rules defining the behavior of the integration and actions on receiving business events from the object within the system of record (i.e., the business object in the enterprise application); (b) a "wall" (i.e., a stream of posts) displaying publication of changes in the data set of the associated object from within the system of record and status posts from members/users of social network with appropriate access rights, where the wall provides an activity stream holding short, sometimes unrelated posts in which old information may scroll off the bottom of the list; the wall may differ from a conversation in which all content is related; (c) a set of related conversations or other social objects (e.g., a "Project portfolio" social object can be related to multiple "tasks" social objects); (d) a membership potentially defined, controlled and managed by the system of record or open to sharing across the network with individuals and groups; and/or (e) a "gadget" storing data from the associated object within a system of record allowing quick access and updates to the original data set within the system of record (e.g., the revenue value of a PPM opportunity is displayed within a gadget and a member with access to the corresponding opportunity social object and the appropriate access rights within the system of record can update the revenue value in the system of record from the gadget tied to the social object within the social network).

Further information regarding an example integration between third party applications or enterprise applications with a social network is described in U.S. application Ser. No. 13/888,888 filed on Dec. 5, 2013, entitled "Method and system for integrating an enterprise application with a social network application", which is hereby incorporated by reference in its entirety.

More pertinent to the current inventions, in addition to creating social objects pertaining to one or more ongoing projects at the enterprise social network, the ensuing conversations regarding the created social objects can be advantageously leveraged in order to understand many aspects about the project, even prior to the availability of standard metrics for the one or more projects. For example, at the start of a project designated at the PPM system, a corresponding social object may be created and populated at the social network, enabling interaction between multiple users (e.g., team members, leads, managers, business heads, etc.). These conversations can be mined and analyzed to understand many aspects about the project. These conversations can provide valuable insights to the project manager or any user of the PPM system in the absence of traditional metrics (e.g., project completion dates, collected revenue, etc.). This, in turn, may help the project manager make important decisions regarding the project at a much earlier stage.

For example, the project manager may fast-track a particular project, after sensing a general positive buzz about the project. Or, in another example, the project manager may sense that team members are not optimistic about a particular project, and may decide to scrap the project altogether. Thus, rather than waiting for the completion of the project and/or standard metrics to evaluate the project progress, social data can be advantageously used to glean the overall sentiment, punctuality, momentum, difficulty and many other factors regarding the project.

Figure 3:
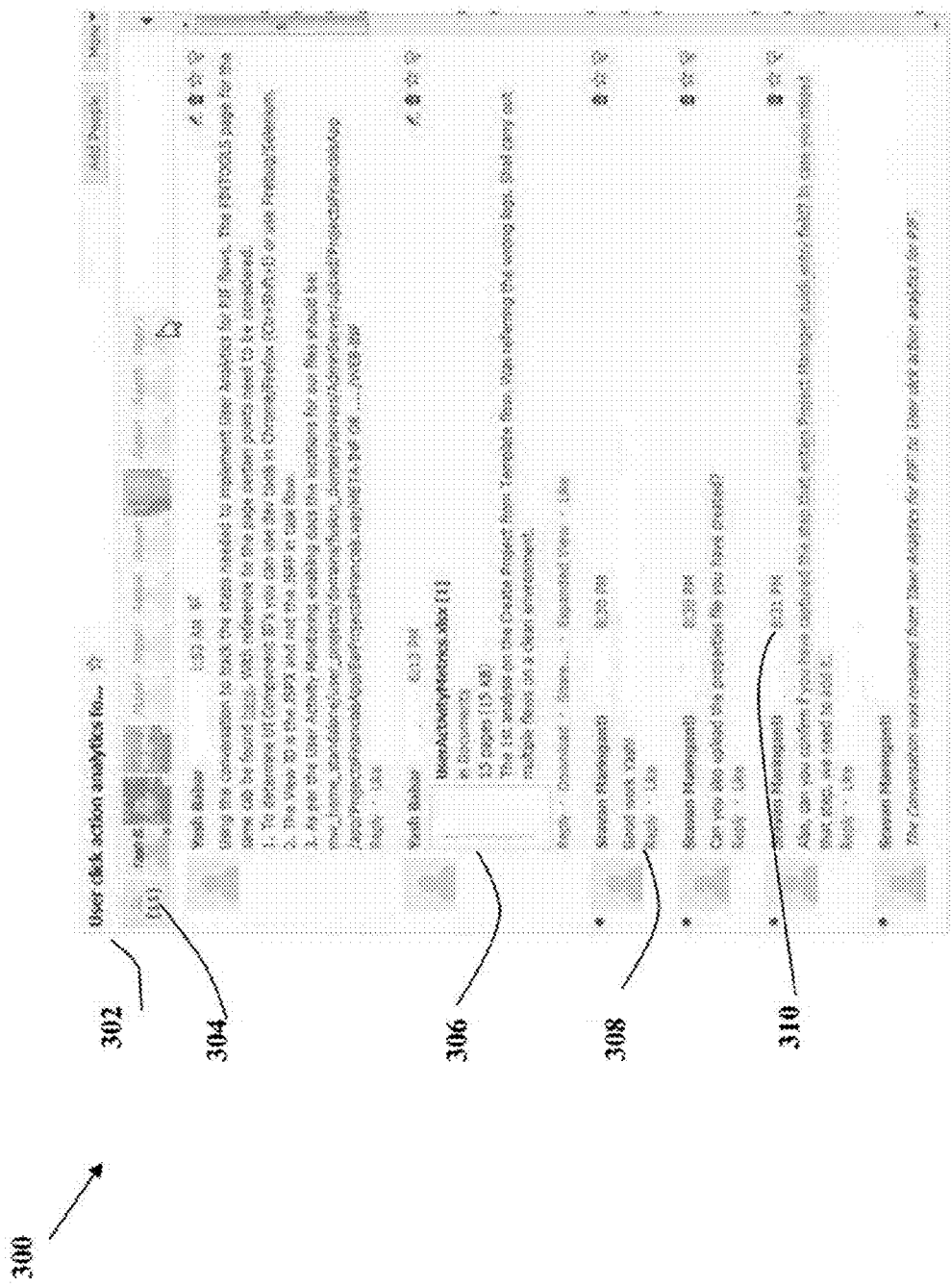
FIG. 3 illustrates an example conversation regarding a particular project on the social networking application.

For example, referring to FIG. 3, an example conversation on a social network regarding a particular project is illustrated. The social object in the illustrated embodiment pertains to a particular project/project task entitled "User click analytics . . . " in the name field 302. As shown in FIG. 3, a number of comments have been inputted by various members of the social network, the comments pertaining to the particular project. The particular project/project task includes a number of members 304. The members may be team-members of a particular project, members interested in the particular topic, subscribers of the topic, commenters on the topic, etc.

In one or more embodiments, the number of members of the social network associated with a particular project may be analyzed, either independently, or along with other factors, to understand the social pulse of the project. For example, a project having a large member base (either assigned by the enterprise, or self-assigned by the employee) may be gauged as more positive than a project having a lower member base. Or, in another example, more buzz or conversation regarding a particular project/project task may be indicate a higher interest/positive response about the project.

As part of the conversations regarding a particular project of interest, users may optionally attach documents, files or records (306). These attachments may be records of direct value to the project (e.g., integrated PPM object transformed as social object) or in other embodiments may be extraneous files tangentially related to the project. In one or more embodiments, the presence and exchange of business related documents between users may also be an indicator of positive progress for the project. Similarly, the number of comments/conversations regarding a particular project/project topic may also be used to understand a social health of one or more projects. For example, the frequency of comments, as derived from timestamps of the comments (310) may be used as an indicator of positive social health for the project. A project that garners many conversations/comments may be seen as an indicator of positive progress. Thus, many metadata values from the social network (e.g., number of comments, number of members, frequency of responses, number of responses, timestamps of conversations, location of conversations, number of attachments, designation of member within enterprise, etc.) may be advantageously used to understand the social health of the project.

In addition to metadata, the content of the conversations themselves can also be analyzed for sentiment to understand the nature of conversation revolving around the project. For example, a positive sentiment ("Good job!") from a team-lead to a team member (308) may be used as an indicator of positive social health of a project. Similarly, other key words may be successfully mined from conversations to understand sentiment (e.g., good job vs. need to improve), progress (e.g., quick vs. delay), difficulty (e.g., easy vs. challenging) and many other aspects of the project. In one or more embodiments, a natural language parser may be run through the content of the conversations to provide one or more indicators about the project.

Figure 4:
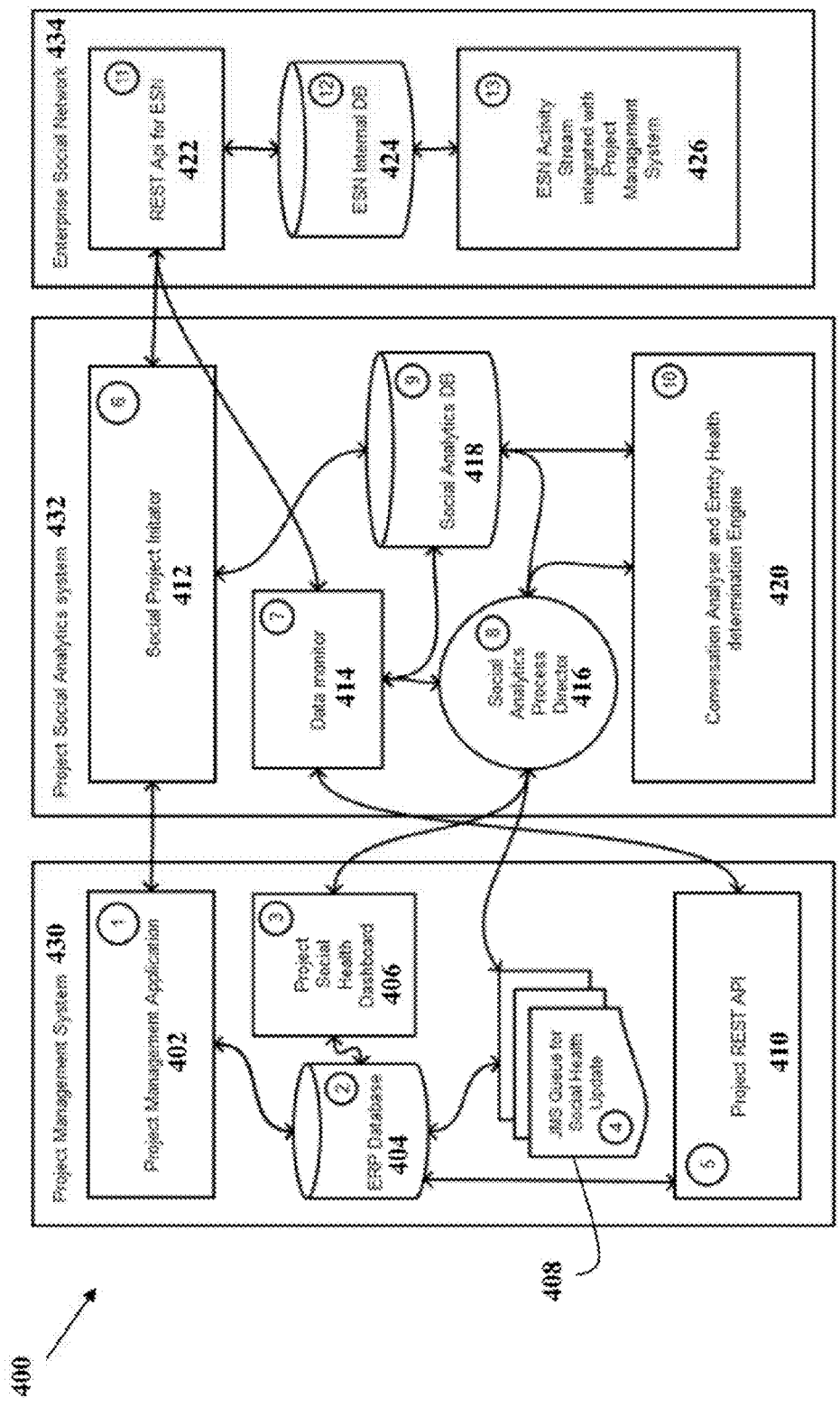
FIG. 4 illustrates a system architecture depicting an interaction between the enterprise project management application, a project social analytics system and the social networking application.

FIG. 4 illustrates an example system architecture that may be used to integrate a project management application with a social network application, and also extract and analyze data from the social network and integrate the data back to the project management application. It should be appreciated that the integration between the PPM and social network is performed through a connector mechanism described in earlier disclosures, and the present disclosure will focus more on mining and analyzing social conversation, and using the analyzed social conversation at the PPM system. As shown in FIG. 4, the system 400, at a high level comprises a project management system 430, a project social analytics system 432 and a social network 434. Social objects are created for various enterprise business objects and integrated into the social network to facilitate conversation between members of the social network. The nature and content of these conversations may also be similarly analyzed and used at the enterprise project management system.

The project management system 430 comprises a project management application 402, which is typically an enterprise project management application. The project management application may be accessed by project managers of the enterprise, or independent project managers contracted by the enterprise. The project management application 402 may include a user interface that allows users to interact with the project management application 402. Through the user interface, one or more project managers may create one or more projects, enter data regarding one or more projects, monitor the progress of one or more projects, track projects and perform other related actions on these projects.

A user (e.g., project manager), when creating a project, may provide basic information about the project (e.g., project name, start date, department, identifiers, classification, description, resources, team members, budgets, costs, infrastructural requirements, etc.). The PPM system may use traditional metrics to assess progress/success of a project. For example, the project management application 402 may provide metrics regarding the project based on adherence of the project to a given schedule, adherence to a given budget of the project, key performance indicators of the project, stakeholder confidence/satisfaction, etc. These are examples of traditional factors used to assess the project. However, these factors may not be available until the project is well underway, as discussed at length above; thus, in the traditional system, the project manager may be out of the loop about a project's progress/health until he/she receives those metrics. Incorporation of the project social health dashboard, however, allows the user to view and interact with the social health of the project, thereby providing social information about the project prior to the availability of the traditional metrics.

The project management application 430 may also comprise an ERP database 404 (e.g., a relational database) to hold enterprise-related project management information.

The ERP database 404 may also store data related to the social media analysis data that is fed into the project management application 402.

As shown in FIG. 4, the ERP database 404 feeds into a project social health dashboard 406. The project social health dashboard is part of the project management system and may be accessed through the project management application 402, in one or more embodiments. For example, the user interface associated with the project management application 402 may include a "project social health dashboard" tab that may be used to monitor the health of the project as analyzed through the social media. The project social health dashboard 406 may be part of the traditional project performance dashboard in one or more embodiments. In other embodiments, the project social health dashboard may be accessed separately from the traditional project performance dashboard.

As discussed above, the social analytics data for the dashboard may be stored in the ERP database 404, and may be updated at a predetermined frequency. In one or more embodiments, the user may have the option of accessing live social analytics data to capture the latest data. The analytics report presented at the project social health dashboard 406 may provide a number of insights on the project, including, but not limited to: (1) overall entity or project health, (2) project punctuality, (3) project financial health, (4) project participant satisfaction, (5) participation frequency, (6) highest discussed sub-projects, (7) most active trending topics and themes, (8) timeline of project conversation, (9) parties' involvement in percentage, (10) social health comparison between various projects, (11) common qualities between successful projects. Similarly, many other reports/analytics may be generated for various facets of the project.

The project management system 430 also comprises a JMS queue for social media health update 408 to periodically update the ERP database 404 with latest data captured from the social media analytics system 432. This ensures that the data presented to the user at the project social health dashboard continues to stay current and relevant for the project managers. The JMS queue 408 expects Java messages against unique project identifiers with a predefined object containing social analytics metrics. The messages may contain bulk updates or single updates (e.g., in response to a user-initiated dashboard update).

The project management system 430 also comprises an API mechanism 410. Most PPM system may expose their data via a non-UI mechanism. The mechanism could be a web service, API or a file import process. This mechanism may be used to track the projects for continually changing data. The API service may be queried periodically to check for ERP data updates, in one or more embodiments.

The project social analytic system 432 comprises a social project initiator 412 to ensure the integration between the ERP entity (project management system, in this case) with a conversation or unique social object in the enterprise social network. The social project initiator 412 may be configured to pass basic entity information when the project management user chooses to begin a social conversation with an entity or a project. The social project initiator 412 may further be configured to call the REST API of the enterprise social network to create a new conversation or social object corresponding to the project entity with relevant details. In other words, the social project initiator acts as a (one time) connecting mechanism (including relevant mapping information) to associate the business objects (e.g., project management objects from PPM) with the right conversations at the social network.

In one or more embodiments, the social project initiator 412 may comprise a mapping sub-module (or the mapping information may be stored in one or more databases of the project social analytics system 432) to map business objects from the enterprise system (e.g., project management system) to social objects of the enterprise social network. The mapping may be a 1 to 1 mapping, a many to one mapping or a many to many mapping. In one or more embodiments, the mapping may be stored in the database 418, as will be described below.

In one or more embodiments, the project social analytics system 432 also comprises a social analytics database 418 that maintains data from the social analytics system, and may also maintain relevant data from one or both of the enterprise systems as well. For example, mapping information may be stored in the database 418 in one or more embodiments. In one or more embodiments, the database 418 may include a unified document with a business entity mapped to its primary conversation.

Similarly conversation data about to be analyzed may be stored in the database 418. In one or more embodiments, conversation data may be maintained only temporarily until analyzed by the social analytics system and then may be purged. The database 418 may also store hashes for the data monitor, as will be described below, structural information of the conversation (e.g., metadata about conversation) and business relations between entities.

In one or more embodiments, a traditional relational database model may be used. In other embodiments, a NoSql non-relational database may be used due to its strong compatibility with JSON and other data communication formats frequently used by Social Network APIs.

In one or more embodiments, the project social analytics system 432 also includes a data monitor 414 to keep the analytics data up-to-date with the source data. In other words, the data monitor 414 ensures that conversations are continually mined, and monitored for updates, based on which analysis can be performed. Since conversations may grow incrementally over time, a hash value may be maintained for the project's business data and social conversations separately, in one or more embodiments. In one or more embodiments, the data monitor 414 may be prompted by the social analytics process director 416 to poll for changes in the social network. If the hash value of the response of a conversation changes, the changes may be updated in the database 418. The hash values may be stored in the database 418 and may be referenced against the project's unique identifier, as described above. In one or more embodiments, the data monitor may be further configured to convert incoming data into various formats in order to facilitate analysis of the data at the project social analytics system 432.

The project social analytics system 432 also comprises a social analytics process director 416 to trigger the analytics process and automate the capturing of any changes in social data. The director 416 may also be configured to schedule semantic and sentiment analysis processes for one or more embodiments. Further details on the director 416 will be described with respect to FIG. 5 further below.

The actual analysis of the scheduled semantic and sentiment analysis is performed by the Conversation analyzer and Entity health determination engine 420. The engine 420 includes various analysis logic and at least one natural language processing mechanism to perform many types of analyses on the extracted social network conversation data, including both textual data and metadata. As described above, valuable insights may be gleaned not only from the content of the conversation (e.g., positive/negative sentiment), but also from various structural details of the conversation (e.g., frequency, time of conversation, type of users of the conversation, designation of the user, etc.). Further details on the engine 420 will be described with respect to FIG. 6 below.

In order to communicate with other systems, the social network 434 also comprises an API 422 to make its data available via means of a web service or an API. In either case, the social analytics system 432 may pass a unique identifier of a desired social object to the API to pull the latest conversation and other relevant details for the desired conversation. The API 422 is also used for integrating business objects to one or more social objects. In one or more embodiments, the API may be a representational state transfer ("REST") API.

It should be appreciated that the enterprise social network 434 also comprises its own internal database 424. The database 424 may store data associated with one or more social objects of the social network. All the information about various conversations around a social object may be stored permanently in the ESN database 424.

The social network 424 also comprises an ESN activity stream integrated with the project management system 426. The activity stream 426 allows authorized users to create, participate and modify conversations around one or more social objects. The ESN activity stream 426 provides users with a user interface to interact with the enterprise social network. From the ESN's user interface, authorized users may import business objects from the PPM, participate in conversations about one or more social objects in the social network and interact with other members of the social network.

Figure 5:
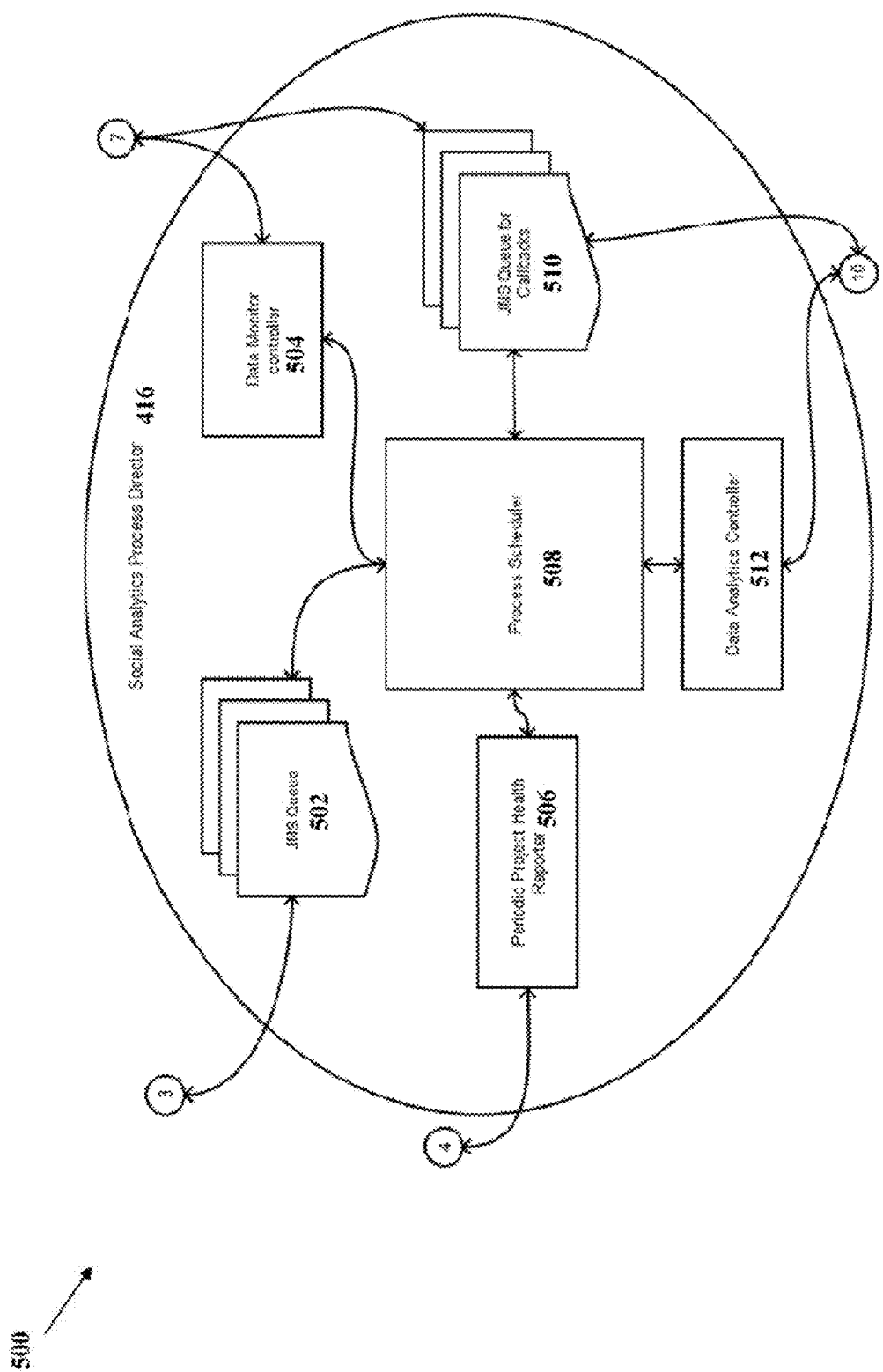
FIG. 5 illustrates a detailed view of a process director of the project social analytics system of FIG. 4.

Referring now to FIG. 5, a detailed view of the social analytics process director 416 is presented. In one or more embodiments, the director 416 comprises a JMS queue 502 configured to connect to the project social health dashboard 406. The project social health dashboard 406 may request manually triggered re-analysis of entity specific conversations based on user input, for example.

The social analytics process director 416 also comprises a process scheduler 508 which is configured to schedule a frequency of data monitoring or analysis. As described above, although the project social health dashboard 406 may request an update for latest analytics data, most of the analytics is scheduled to occur at a preset frequency. The scheduler 508 may be triggered by the JMS queue or a preset frequency. The scheduler 508 may send the trigger of data change monitoring in any business or social object. Specifically, the scheduler 508 may be configured to pass unique identifiers or a range of identifiers pertaining to one or more desired social objects to the data monitor controller, as will be described below. In one or more embodiments, the scheduler 508 may also receive feedback from the data monitor 414, and may further determine whether re-analysis of the conversations pertaining to one or more social objects is required.

In one or more embodiments, the social analytics process director 416 also comprises a data monitor controller 504. The data monitor controller 504 may be structured as a connecting module to the data monitor 414, which also performs mapping resolution for any analytics identifiers and passes it along to the data monitor. Additionally, the data monitoring controller 504 may maintain an ability to converse with the analytics database 418.

The social analytics process director 416 may also comprise a data analytics controller 512 that comprises execution logic and other processing functionalities for the director 416. Specifically, if there is a change in the underlying social data which requires recalculation of the analytics, the data analytics controller 512 may be called by the process scheduler 508 to schedule multiple processes for different projects. If the projects are independent of each other, then the controller 512 may analyze the data in parallel. Or, if the projects are interdependent, the controller 512 may identify a suitable order of analyzing the projects with relation to each other. In one or more embodiments, the controller 512 may pass on unique identifiers for business or social objects as necessary.

In one or more embodiments, the social analytics process director 416 also comprises another JMS queue for callbacks 510. As multiple operations may be called through the data analytics controller 512 and they may be asynchronous in nature, the responses from these modules may be expected back as messages. The JMS queue for callbacks 510 may then pass this to the process schedule 508 to determine the next step for such messages.

The periodic project health reporter 506 may be configured to pass on any new analytics information to the project management application 502. The periodic project health reporter 506 may be viewed as the last step in the cycle of the director 416, when a reasonable amount of data has been re-fetched and analyzed, or when an explicit update has been called by the dashboard. In one or more embodiments, a JMS client may send out data via messages to the project management system.

Figure 6:
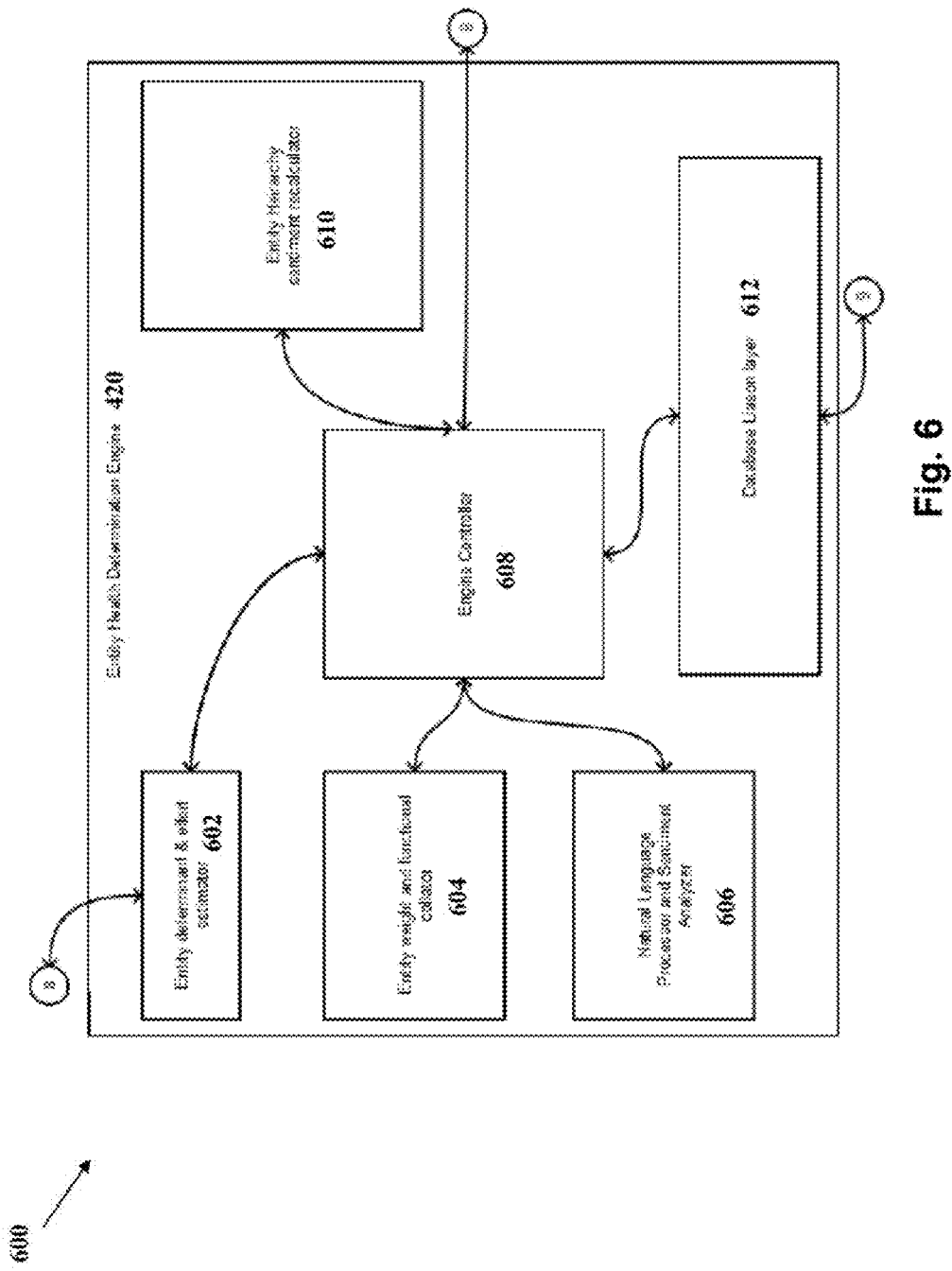
FIG. 6 illustrates a detailed view of an analysis engine of the project social analytics system of FIG. 4.

Referring now to FIG. 6, the conversation analyzer and health determination engine 420 will be described in further detail. The project health determination engine 420 may comprise an entity determinant and effort estimator 602, in one or more embodiments. The entity determinant and effort estimator 602 may be configured for the initial determination of involved project entities and structures and their associated database objects. The entity determinant and effort estimator 602 may also estimate a new content length of any modified social objects, and whether any objects may be split into multiple processes. This determination may be relayed back the director 416, in one or more embodiments.

The project health determination engine 420 may also comprise an engine controller 608, which is a central organizer and controller of the engine 420. The controller 608 may break down one or more social conversation into recursive parts, and may then relay the parts for semantic and sentiment analysis by other modules of the engine 420. For example, the controller 608 may break down a project into various tasks and/or sub tasks, as will be described in further detail below, and relay the parts for analysis. The analysis of the project may be a cumulative total of the analysis of all of its sub-parts, in one or more embodiments.

In one or more embodiments, the controller 608 may also drive various entity associations and the impact of sub entities on the main entity or project. The controller 608 is also configured to put together the different components of analysis and transmit the combined results of the analysis of the project to the database 414. As discussed above, once the analysis of various parts of the project (i.e., tasks and sub-tasks) are complete, the controller 608 combines the results and facilitates storage of the analysis in the database 414.

The project health determination engine 420 may also comprise a natural language processor and sentiment analyzer 606. The natural language processor and sentiment analyzer may be an out of box system incorporated into the project social analytics system 432 to assist in qualitative and quantitative analysis of social conversations pertaining to one or projects or sub-projects. The natural language processor may be fed with predetermined words and associations to train the processor to analyze the underlying sentiment of a given set of words, or contextual data. In one or more embodiments, the natural language processor may be trained on appropriate data sets, and may, in time, become capable of classifying contextual texts as positive or negative with respect to project management.

For example, the natural language processor may be fed into words that are typically thought of as positive (e.g., "good", "correct", "right", "positive", "bright", "promising", "encouraging", "excellent", "brilliant", "look forward", "benefit", "yes", "yep", "yeah", etc.) or negative (e.g., "bad", "wrong", "negative", "incorrect", "poor", "fair", "appalling", "unsatisfactory", "disappoint", "no", "not", "never", etc.) in a general context. Similarly, the natural language processor may be fed with similar words relating to time like "fast", "quick", "speedy", "on time" in a positive sense or other words like "delayed", "late", "slow", "falling behind" in a negative sense. The natural language process may be similarly able to detect positive and negative words in a fiscal context like "cheap", "within budget", "economical" in a positive sense or other words like "expensive", "costly", "cash flow," etc. in a negative sense.

In one or more embodiments, the health determination engine 420 also comprises an entity weight and functional collator 604. It should be appreciated that while the other modules of the engine 420 process excerpts from the conversation around a social object, the entity weight and functional collator 604 may be configured to compute sentiment probabilities based on weights and relationship drawn from the business data (e.g., project management data) itself. For example, as described in some detail above, the system may provide more weight to a particular conversation or sub conversation or comment based at least in part on a person's designation within the enterprise, or hierarchy within the enterprise.

For example, a comment by a president of the company will be deemed to hold more weight in a particular conversation rather than any other regular employee of the company. Or, in another example, a post by a team-lead may hold greater weight when compared to members that are not actively part of the project. In one or more embodiments, the weight may be based on the hierarchy of people within the enterprise, and this information may be derived directly from the project management system 430 rather than the social network 434. Or, in other social networks, this information may simply be derived from the social network itself, depending on the nature of the social network.

In other words, the social analysis of the conversation may be impacted based on author-based weights. For example, a comment or post by a project client/investor contact may be assigned a weight of 1. A project manager may have a similar high weight of 0.9. The person to whom the entity is assigned to may be assigned a weight of 0.8, for example. Similarly, a project team member of a large team may be assigned a significantly smaller weight of 0.2, or a non-project member may be assigned a weight of 0.1.

The health determination engine 420 may further comprise an entity hierarchy sentiment recalculator 610 that is configured to receive information from the entity weight and functional collator 604 and use this information to re-evaluate an entity's contribution to its parents or other ancestor.

The health determination engine 420 may further comprise a database liaison layer 612 to traverse through temporarily stored conversations, hierarchies and business data for analytics purposes. The database liaison layer 612 may further store any recomputed analytics into the database 414. It should be appreciated that the only outgoing communication from the engine beyond the database liaison layer 612 may be the JMS calls from the controller after this layer has successfully executed. The database liaison layer 612 may also be configured to purge any unnecessary conversations form the internal database 414.

Having discussed the system architecture of the PPM social analytics system in detail, further details on how conversations around one or more project entities or sub-projects are analyzed will be provided. Given that various communications pertaining to projects or tasks within the project are used for analysis, more details will be provided as to the structure of communication data. It should be appreciated that this structure, as will be described in detail below is an example structure only, and other structures/assumptions may be similarly used in other embodiments.

Figure 7:
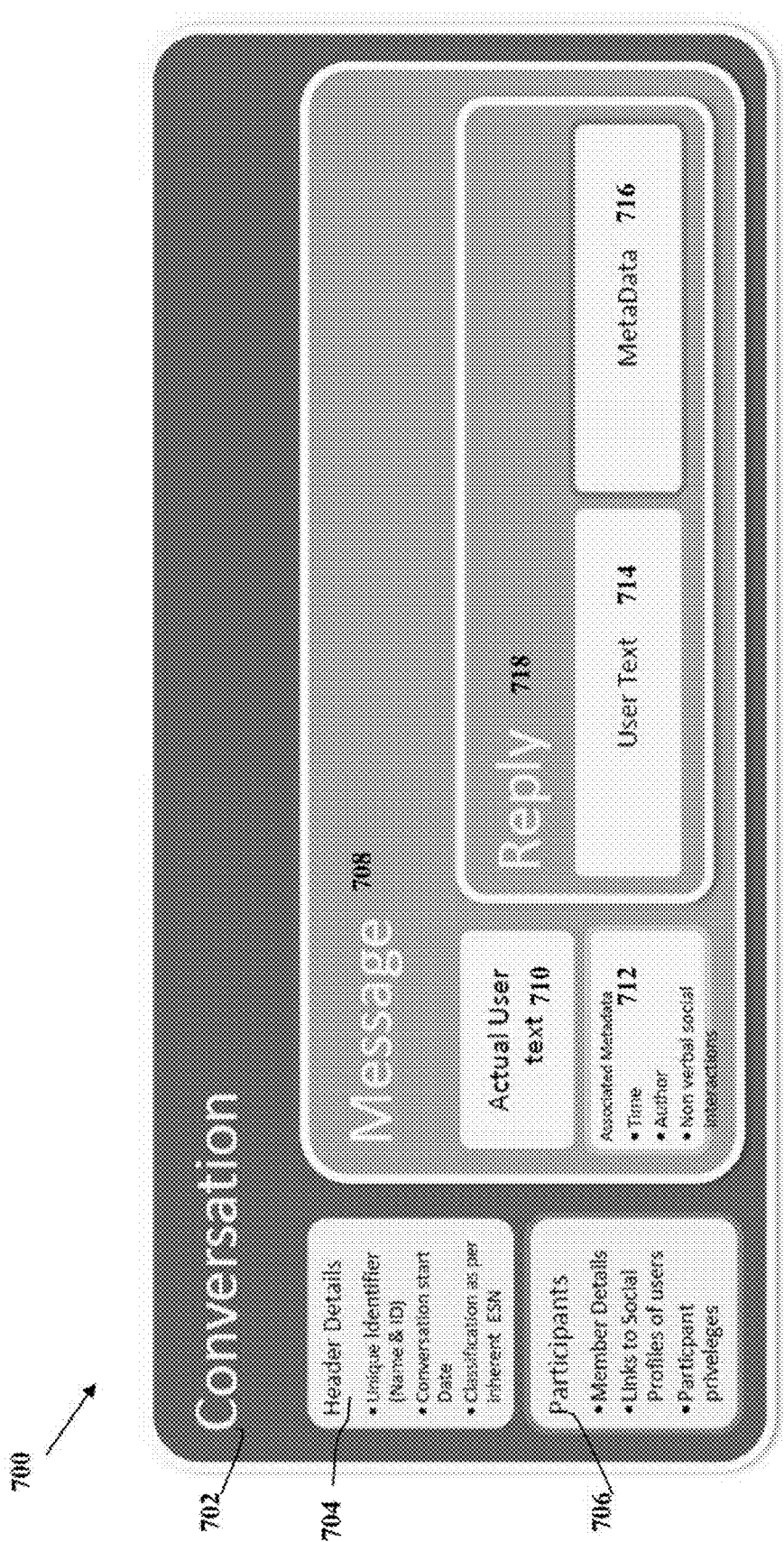
FIG. 7 illustrates an example structure of a conversation at the enterprise social networking application.

Referring now to FIG. 7, the structure of conversations around one or more social objects pertaining to enterprise projects will be described. The conversation 702 comprises header information 704, participant information 706, message information 708 and any replies 718 pertaining to the message. In one or more embodiments, each conversation used for analysis takes place in the context of a particular business entity, and is either mapped or is to be mapped to an enterprise entity. There may be multiple conversation chains for a single business entity. It may also be assumed that there will always be one primary social object per entity, and other conversations (i.e., child entities of the parent) may be organized under this root conversation.

The header information 704 may include the unique identifier information of the conversation, a start date (e.g., timestamp) of the beginning of the conversation, any updates to the conversation, and any classification (e.g., as part of the enterprise social network) that is assigned to the conversation. It should be appreciated that the example conversation structure of FIG. 7 is illustrative only, and other structures may be similarly implemented. Other embodiments may comprise additional header information or metadata information as well.

An entity in communication may either be directly linked to an entity social object, or in other embodiments, the link may be determined by tagging the root node of a tree of conversation (i.e., project>project task> sub-task, etc.) with a unique identifier or other social entity identification inherent to the social network. In one or more embodiments, the message node at which a mention of an entity first occurs chronologically may be considered to be the root of the subtree to be picked up in context of that business object.

The conversation 702 may be associated with a set of participants, as shown in the example conversation of FIG. 3 (304). The participant information 706 may include member details, links to social profiles of the members, and details about participant privileges, in one or more embodiments.

The conversation 702 includes the message 708, which is the actual content of the conversation. While the header information and the participants provide various metadata information about the conversation, the message 708 includes the actual content of the message 710 as well as associated metadata of the message 712 (e.g., time, author, non-verbal social interaction, etc.). In one or more embodiments, the conversation 702 may also include any replies to the message (e.g., comments, "likes", etc.). The reply 718 also includes the actual text of the reply 714 as well as associated metadata of the reply (e.g., time, author, etc.)

In one or more embodiments, the conversation may be represented as a directed graph, the nodes representing a message or reply. Each node, in addition to possessing information of its incoming and outgoing links, also contain at least three variables: time of posting, identity of author, any user-generated content, text body, "likes," "shares," votes, and other non-direct user-generated content.

Figure 8:
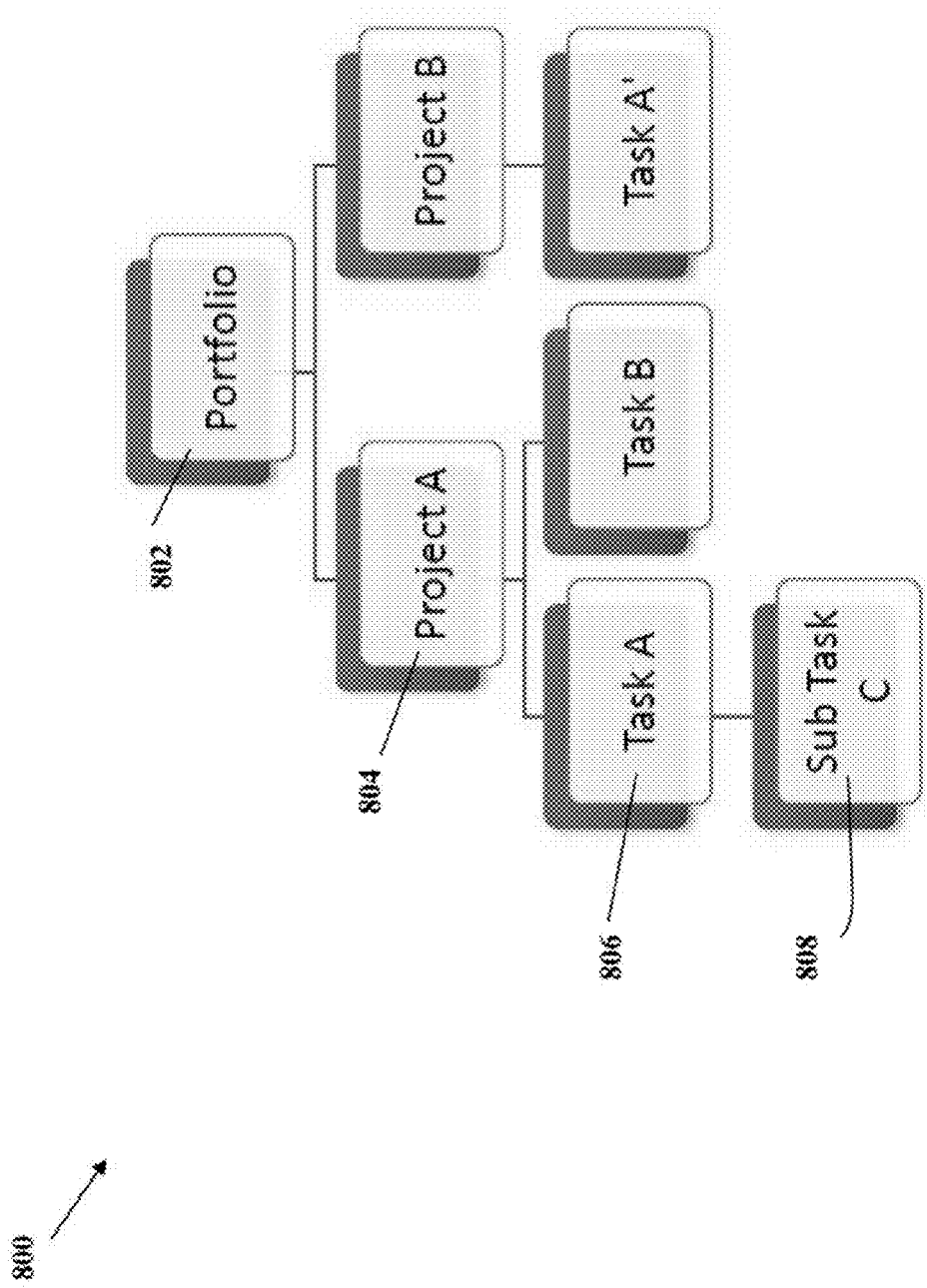
FIG. 8 illustrates an entity hierarchy to be used in social media analysis of one or more projects of the project management application.

Referring now to FIG. 8, a hierarchical nature of conversations regarding one or more projects is described. While various project management systems use different methods of classifications, and a project may have many "children" or sub-categories, they may all be considered equal in their social representation. The grouping of various tasks or projects of a portfolio may be based on geographic, temporal, or cost based classifications.

As shown in FIG. 8, multiple sub-tasks 808 may make up a particular task of a project 806. Similarly, multiple tasks 806 may make up a project 804, and multiple projects may make up a portfolio 802. This hierarchy is significant in order to perform analysis of social media conversations around one or more social objects of the social network. To understand the social health of a particular portfolio, one may need to understand the social health of projects within that portfolio. Similarly, to understand the social pulse of a project, one may need to understand the pulse of various tasks within that project. Thus, the social health of a project may be calculated as a cumulative factor of the tasks associated with that project. Providing this level of granularity in the calculation of portfolio social health also ensures greater accuracy in the predicted values for project social health. Additionally, the provided granularity allows social health of a project to be calculated for even small tasks or sub-tasks, and the values of the tasks or sub-tasks may hold different weights in calculating the overall portfolio social health.

More particularly, the system may assign a probability for project social health of a particular entity. The project social health of the particular entity may be calculated as a sum of the health of sub-projects within the particular entity. It should be appreciated that many disparate algorithms may be used in calculating the project social health, and the suggested relationships described below are for illustrative purposes only.

In one or more embodiments, the system may define a value between 0 to 1 to represent project social health. A value closer to 1 may indicate positive project social health whereas a value closer to 0 may indicate poor project social health. It should be appreciated that this value should not be confused with the probability of achieving acceptable variance with the average perception of the sentiment of the given social data. In fact, the probability V is directly dependent on the children of a particular entity E and its own attributes. For example, an equation such as Equation 1 below may be used to estimate the project social health V of an entity E.

$$V(E) = (1-m) \cdot C(E) + m \cdot \sum_{i=1}^{n} V(e_i) \cdot w_i$$

Here, m is the degree of influence of all contributors, w is the individual weight assigned to each contributor. C(E) is the conversation analysis function for entity E. The conversation analysis function is a sentiment vector of the conversation based on the different parts of the conversation. The conversation analysis function will be discussed in greater detail further below.

With reference to equation 1 above, for the bottom most node in the entity relationship diagram (e.g., sub-task 808 as shown in FIG. 8), the second part of the equation will be 0 because the bottom most node has no children or subtasks. Hence, for each node of the entity relationship diagram similar to that of FIG. 8, the equation above may be used to predict project health. Of course, for the portfolio 802 of FIG. 8, the health of the portfolio is calculated based on the conversation analysis function for the entity (e.g., the portfolio) as well as the sum of all the child entities under the portfolio (e.g., projects, tasks and sub-tasks).

Referring back to Equation 1, the value m may be determined by the amount of data available for the children vs. the parent. For example, direct information derived from the parent's social object may be considered to have higher value than information derived from a child's social object because the parent's information may be more likely to document overall progress. The value m may be calculated through an example equation 2 below:

$$m = \frac{\sum_{i=0}^{n} Cv(e_i)}{Cv(E) + \sum_{i=0}^{n} Cv(e_i)}$$

In Equation 2, Cv(X) (Content value estimator) may be quantitative measure of the content available for any entity. Cv(X) measures the number of messages, content length and unique participation level for each entity. The Cv(X) value is calculated to capture the potential value in a conversation rather than treating all content equally. Thus, a conversation having a greater number of messages, or longer length may be valued higher than a conversation with a lower number of messages. Rather than treating all conversations the same, this value introduces greater nuance in calculating the significance of the particular conversation relative to other conversations, as shown in Equation 3 below:

$$Cv(E) = \ln N\text{words}(E) \cdot \ln N\text{participants}(E) \cdot \log N\text{messages}(E) \cdot (\text{Height}_{E'}(E)+1)$$

As shown in Equation 3, the Cv(E) is calculated as a function of a number of words in a conversation, a number of participants, the number of messages, etc. The value E' refers to the root node of the subtree of which E is a member. This root node is necessary to compute the relative importance of the children. For example, an entity that is closer to the root node (e.g., project level entity) may be weighted higher than an entity that is further away from the root note (e.g., sub-task level entity). Thus, as shown above, Cv(E) may be computed as a function of various aspects of the conversations (e.g., number of messages, participants, etc.) and with respect to the root node E'.

In one or more embodiments, the varying content and perceived important of sub-entities of the parent's sentiment must also be considered in calculating entity health. The weight of an entity or sub-entity must also take into account the entity's importance in the context of the enterprise and the content value Cv(E), discussed above.

$$W(E) = f(E) \cdot Cv(E)$$

Equation 4 above may be used to determine an absolute weight of the entity. Here, f(E) is the functional value of an entity with respect to cost, time, resource allotted and expressed indicators. W(E) is the absolute weight among children of the root node E'. To calculate the relative weight of a sub-entity, a different equation, similar to equation 5 below, may be used.

$$w(e_i) = \frac{W(e_i)}{\sum_{j=0}^{n} W(e_j)}$$

Essentially, the relative weight of a sub-entity is the absolute weight of the sub-entity in relation to the sum of all the absolute weights of the children of the sub-entity.

In addition to the above equations, the analysis of social conversations may also take the author's designation within the enterprise into account while determining project health, as described in some length above. In one or more embodiments, project roles for various members associated with the project may be arranged in descending order of functional importance. For example, as discussed above, the project manager may be assigned a higher weight as compared to a project member. Thus, the importance of the conversation may be heavily influenced by the author, in some embodiments.

In one or more embodiments, user interaction with other members may be similarly tracked and used in assigning weights to the author and to determine a user interaction count, as shown in Equation 6 below.

$$U_{int}(M) = \frac{\text{likes} + \text{favorites} + \text{reshares} + \alpha + \text{replyCount} \cdot \beta + \text{upvotes} - \text{downvotes}}{\text{Audience size}}$$

As shown above, the likes, reshares, retweets and up-down votes may be tracked and counted in one or more embodiments to estimate a user's interaction. Of course, it should be appreciated that the above equation is dependent on the nature of the social network, and other similar equations may be used to gauge user interaction. In the present embodiment, the user interaction of a particular member may be determined based on the number of likes, favorites, reshares, etc. This user interaction value may, in one or more embodiments, be used to assign author weights as well. For example, consider two members who are on the same hierarchical level posting a comment on a conversation pertaining to a particular project. The member's comment having a higher user interaction value calculated through the equation above may be weighted higher than another member who has a lower user interaction value.

As described at some length above, the system not only takes into account the metadata associated with the project entities, but also analyzes the text of the conversation itself to estimate positive or negative project social health. As discussed in detail with respect to FIG. 6, the actual task of processing text and determining the probability of its health may be performed by the natural language processor. The natural language processor may be selected based on its learning abilities and its underlying analysis frameworks.

For example, certain words and their associated adjectives may be highlighted for the project management context. A list of defined business entities may be passed to the natural language processor to identify nouns around which sentiments need to be observed. These proper nouns coupled with common nouns in project management may be used together to train the natural language processor to pick up on positive or negative sentiments regarding various business entities.

In one or more embodiments, a participant satisfaction metric may also be calculated. The participant satisfaction metric captures the general opinion regarding the project. While the general sentiment may capture the social health of a project, the participant satisfaction metric focuses on the mood and participation of members to gauge participant interest levels. To this end, participation in the conversation, frequency of the comments of the conversation and variance, mood mining, latency of responses and conversational length may be used to this effect.

It should also be appreciated that a single business entity may be associated with one or multiple conversations. In the case of a multiple conversations, conversation (e.g., the social wall of a particular entity), equation 1 may be modified accordingly to accommodate multiple conversations, as shown in Equation 7 below.

$$V(E) = (1-m) \cdot C_m(E) + m \cdot \sum_{i=1}^{n} V(e_i) \cdot w_i$$

Here, Cm(E) is a multi-conversation analysis function. Cm(E) may be calculated as a function of the root conversation, and may be calculated with an example equation such as Equation 8 below.

$$C_m(E) = (1-m) \cdot C(Conv_{Root}) + m \cdot \sum_{i=1}^{n} C(c_i) \cdot w_i$$

Referring back to Equation 1, the conversation analysis function C(E) will be described in further detail. It should be appreciated that there may be many ways of determining the conversation analysis function, and the following discussion centers around one example technique only, presented for illustrative purposes. Other techniques may be similarly used to determine the conversation vector of one or more conversations on the social network.

As discussed above, a conversation is typically organized in a hierarchical form (e.g., a conversation has one or more messages, each of the messages has one or more replies, etc., as shown in FIG. 8). Further as the equations above illustrate, a message node contributes to its parents, and the reply node contributes to the parent message. However, to measure the overall conversation sentiment from the incremental nature of its sub-parts, a measurement technique of the sentiment may be desired.

To this end, each node of a conversation may be expressed as a conversation vector having an angle representing the sentiment of the node (e.g., positive sentiment, negative sentiment or neutral sentiment) and a magnitude of impact of the message (e.g., high impact, low impact, etc.).

More particularly, an angle of positivity of each node may be measured to express a degree of positivity or negativity of a given node. An angle closer to 90° may be an indication of positive sentiment, while an angle closer to −90° may be an indication of negative sentiment. An angle closer to 0°, may be an indication of neutral sentiment.

In addition to the angle of the sentiment, a magnitude of impact of each of the nodes of the conversation may be similarly measured. Each node contributes differently to the overall sentiment of the conversation it is a part of. The importance of a node of the overall conversation may depend on the metadata information of the node as well as a functional importance of the data in the node. Thus, in addition to the sentiment, the impact of the message is also the value it brings to the conversation. In one or more embodiments, this value may be defined within a range of 0 to 1.

For example, let's assume that a conversation has 5 nodes (e.g., 1 message, and 4 replies to the message). Each of these nodes may express an angle of sentiment (i.e., a first message may be positive, and may have a high impact, a reply to the first message may be negative, and may have a low impact, another reply to the first message may be neutral and also have a low impact, etc.). The overall sentiment and impact of the conversation may be measured based on the sentiment and impact of all the nodes of the conversation.

Figures 9A, 9B:
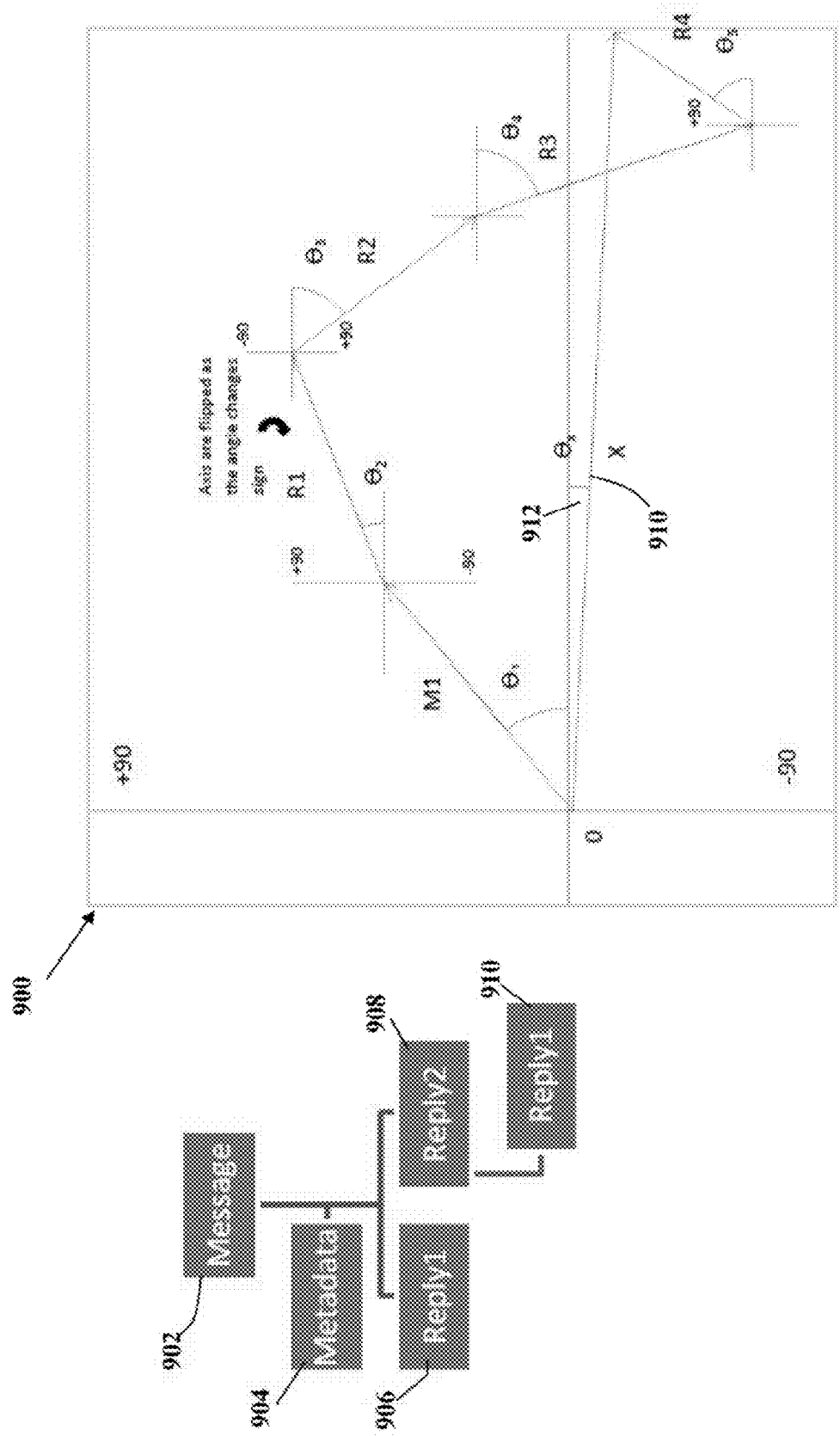
FIGS. 9A and 9B illustrate an example technique for calculating a conversation vector.

Referring now to FIGS. 9A and 9B, an example technique of measuring the conversation vector is illustrated. Let's assume an example conversation similar to that shown in FIG. 9A: a message 902 having a metadata 904, replies 906 and 908, and reply 908 having a sub-reply 910. Each node of the conversation may be represented by a sub-vector having an angle and a magnitude, as shown in FIG. 9B.

It should be appreciated that the context of the previous node is important in the measurement of the current node's sentiment. Thus, the vector of a particular sub-node must be represented relative to the last node's vector and may start where the vector of the last node ends (e.g., vector R1 starts at the end of the vector M1, etc.).

As shown in FIG. 9B, the resultant vector diagram of all the nodes of the conversation is essentially a chain of sub-vectors, each node having a magnitude and angle. In the illustrated embodiment, the angle is flipped when the angle of the sentiment changes from positive to negative or vice versa. FIG. 9B also shows a resultant vector 910 having a resultant magnitude x and a resultant angle $\theta_x$ 912.

While modeling the conversation analysis function as above, the angles and magnitudes may be such that the vectors may always be retained in the first two quadrants. The magnitude of resultant vectors may speak to the relative importance of conversation paths with each other, as seen in FIG. 9B. When a conversation has multiple traversal paths (i.e., multiple linear child node paths from a single parent), conversation vectors similar to FIG. 9B may be constructed for each traversal path of the conversation. All child path vectors from a root node may be vector summed.

It should also be appreciated that the above model is used for the expression of clubbing sentiment value. This may be corrected by regression analysis using participant conversation data. Thus, using the example technique described above, conversation vectors may be constructed for one or more conversations mined from the social network.

Figure 10:
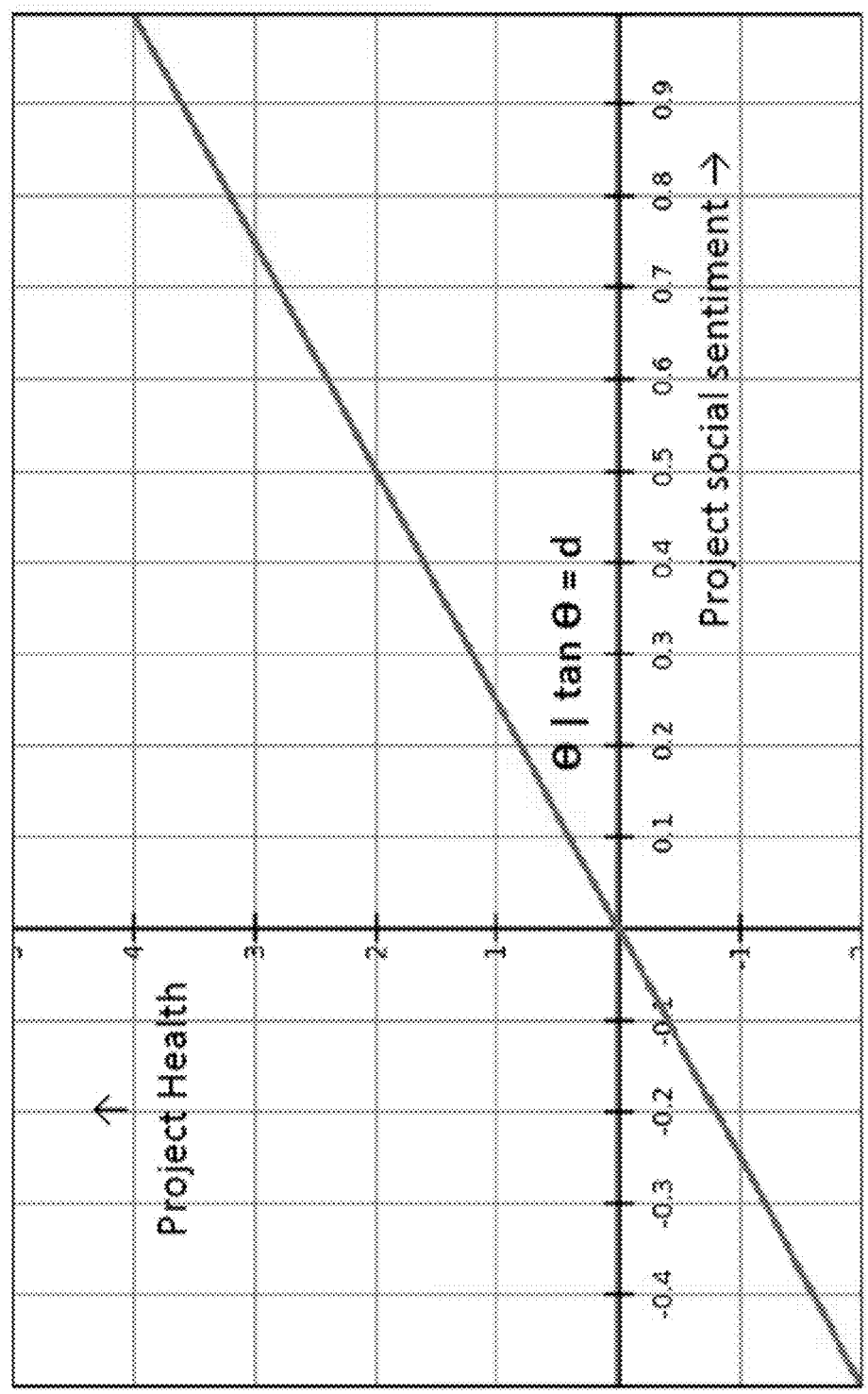
FIG. 10 is a plot view of a project's health and a project's social sentiment.

Referring now to FIG. 10, a plot of project health (i.e., traditional project health measurement) in relation to project sentiment (i.e., project social health) is presented. The early definition of an accurate training set for the natural language processor will make the sentiment analyzer more effective, but human feedback and monitoring of the enterprise performance metrics may also need to be used. The degree of the sentiment can be plotted against an appropriate project health metric shown in FIG. 10. The curve/slope shown in FIG. 10 illustrates a relationship between computed values for project social health in relation to the actual project health determined from traditional metrics. In other words, the natural language processor may be trained until the two values are as close to each other as possible. Depicting these values in a graph shows any relation between the two values. Ideally, the natural language processor may be deemed to be effective when one becomes a monotonic function of another.

The processor would be expected to change its definition of positivity and negativity until the graph has a slope of d against the X axis as shown FIG. 10. Similarly, any other equation may be used to improve the accuracy of the predictions of the natural language processor. In one or more embodiments, the intended relationship between project health and project sentiment may be predefined, and the natural language processor may be trained to fit the desired ratio or slope.

Once the social analysis of the conversations is complete, the analyzed social data is fed back into the PPM system and may be displayed at the project social health dashboard of the user interface associated with the PPM. As described with respect to the system architecture diagram of FIG. 4, the analysis is updated frequently such that a user of the project manager typically views the most up-to-date version of the social media analysis about a desired project.

Figure 11:
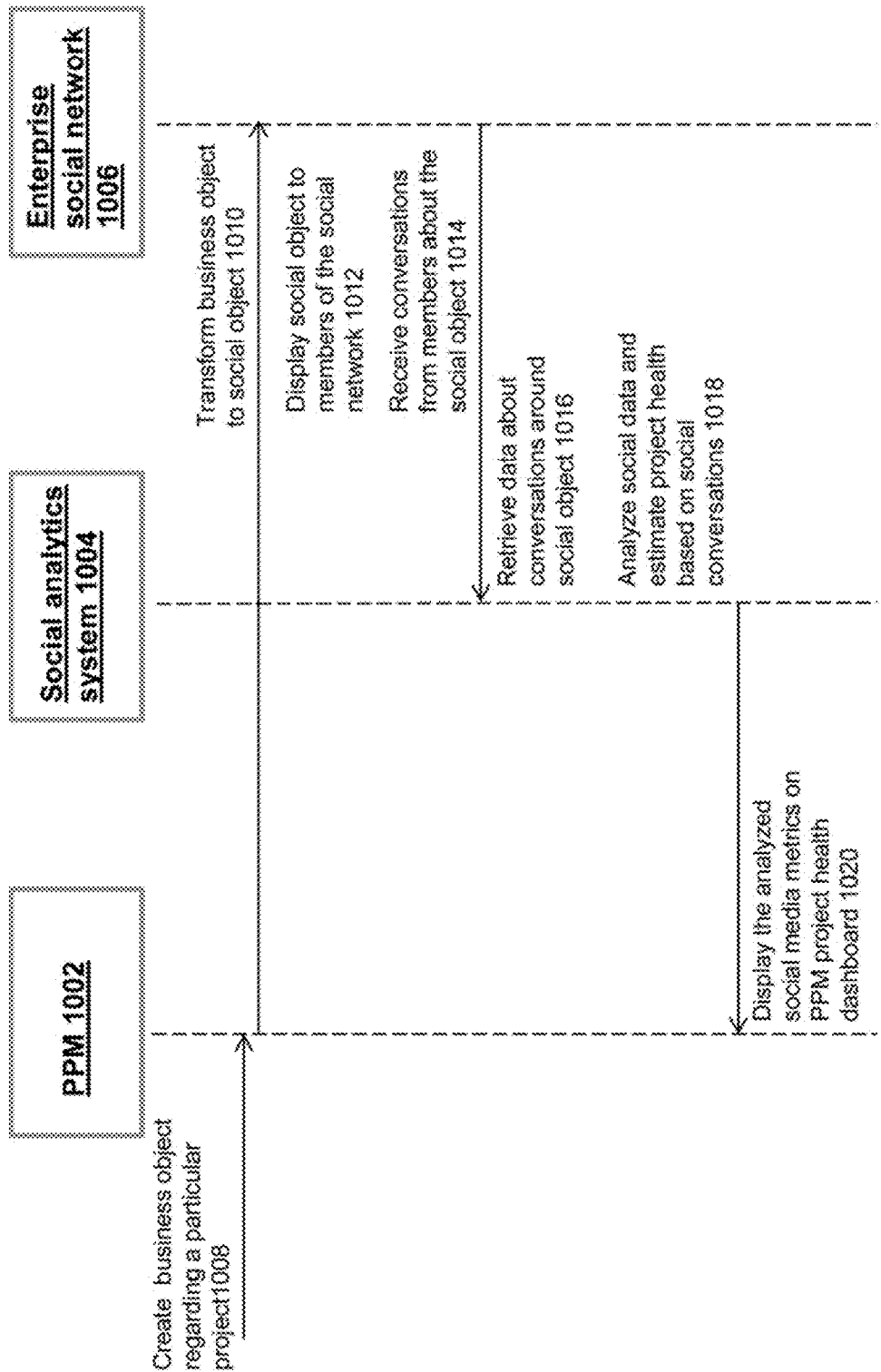
FIG. 11 is a sequence diagram for analyzing social media conversations pertaining to a project.

Referring now to FIG. 11, an example process flow between the enterprise PPM system, the social analytics system and the enterprise social network system is illustrated. At 1008, a particular business object pertaining to a project is created at the PPM system 1002. For example, a project manager may create a new project name and corresponding details of a particular project. At 1010, the PPM business object may be integrated into the social network through a connector process, similar to the process flow of FIG. 2, and the business object is transformed into a social object.

At 1012, the social object may be displayed to members of the enterprise social network 1006. At 1014, members of the social network may interact with the social object and post comments related to the social object and have conversations related to the social object. At 1016, the conversations surrounding the social object may be retrieved at the social analytics system 1004. At 1016, the conversations may be analyzed to estimate a project social health of one or more entities of the project. At 1018, the analyzed social data may be relayed back to the PPM system 1002 and displayed on the project social health dashboard at the user interface of the PPM system.

Therefore, what has been described is method, system, and program product for analyzing social media conversations regarding one or more social objects corresponding to business objects of the project management system and integrating the social media analysis into a project health dashboard of the project management system. This approach advantageously leverages social data regarding a project to provide valuable insights into a project's health, progress and overall success.

System Architecture Overview

Figure 12:
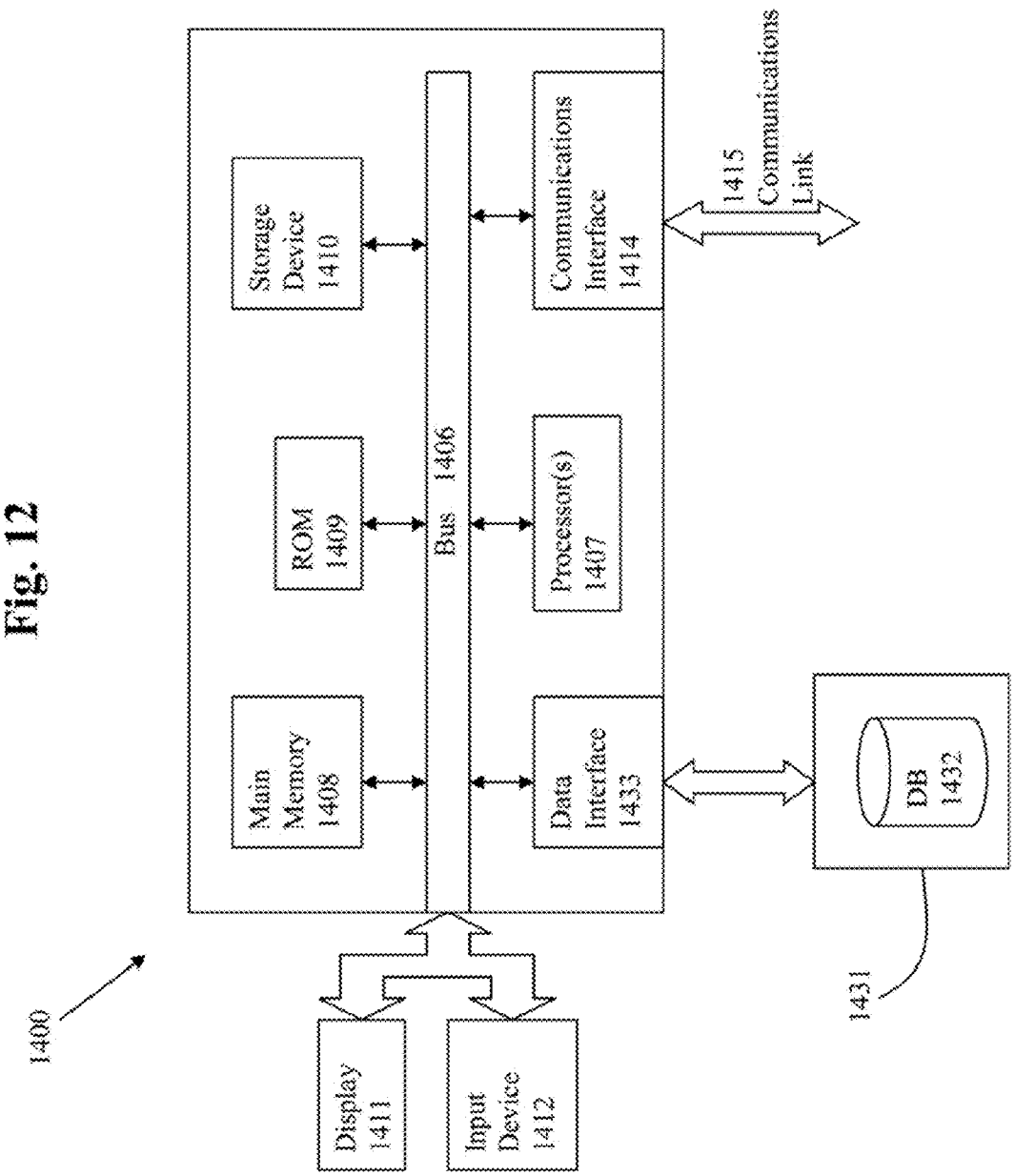
FIG. 12 shows an architecture of an example computing system with which the invention may be implemented.

FIG. 12 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408, e.g., which are carried to memory 1408 over bus 1406. Such instructions may be read into system memory 1408 from another computer readable/ usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed in a database 1432 in storage device 1431 through a data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method implemented with a processor, comprising:
    maintaining a first computing system that implements a first type of data object;
    maintaining a second computing system having a social networking application, the social networking application implementing a second type of data object, the second type of data object being different from the first type of data object, the second type of data object corresponding to social objects within the social networking application, wherein the social objects comprise a stream of messages regarding a specific one or more of the first type of data object;
    maintaining an intermediary system between the first computing system and the second computing system, the intermediary system mapping the first type of data object to the second type of data object;
    generating analytical data for the first type of data object at the first computing system by analyzing the second type of data object at the second computing system, the analytical data generated by:
        creating a social object of the second type of data object at the social networking application, wherein the social object of the second type of data object is mapped to the specific one or more of the first type of data object, the social object corresponding to a project associated with an enterprise project management application at the first computing system;
        tracking a set of social media conversations associated with the social object by identifying a quantity of the stream of messages that have been posted within the social networking application for the social object; and
        analyzing the quantity of the stream of messages that have been posted within the social networking application for the social object to determine the analytical data for the first type of data object at the first computing system, the analytical data corresponding to the set of social media conversations is used to estimate a social health of the project;
    displaying the analytical data in a user interface at the first computing system, the analytical data for the first type of data object at the first computing system being derived from the second type of data object from the second computing system, the analytical data providing the estimate of the social health of the project at the enterprise project management application;
    implementing the first computing system to comprise a management application, a database, a message queue, and a first API (applications programming interface), wherein the management application corresponds to the enterprise project management application, the database holding the first type of data object, the message queue holding updates to the analytical data, and the first API providing access to the first computing system for the intermediary system;
    implementing the intermediary system to integrate the first computing system with the second computing system, the intermediary system comprising a first database to hold mapping information that maps the first type of data object to the second type of data object, the intermediary system further comprising a second database to hold data from both the first computing system and the second computing system, wherein one or more hash values are maintained to track business data and social conversations;
    implementing a second computing entity to comprise a second API to make the second type of data object available to the intermediary system, wherein a unique identifier for a desired social object is passed to the second API, the second computing entity further comprising an activity stream that allows users to create, participate and modify conversations about the social object; and
    configuring the social object to include one or more of (a) a set of programmatic rules defining behavior of integration between the first computing system and the second computing system; (b) a wall that displays posts from members and users of the social networking application; (c) a set of related conversations; (d) a membership of individuals and groups with access to the social object or (e) a gadget that provides access and updates to the first computing system.

2. The method of claim 1, wherein a process scheduler schedules one or more processes to determine the analytical data for the first type of data object, where multiple processes performs analysis in parallel for different ones of the first type of data object that are independent of one another.

3. The method of claim 1, wherein the set of social media conversations are represented in a hierarchical format having a plurality of nodes, the plurality of nodes corresponding to the quantity of the stream of messages or replies to the set of social media conversations.

4. The method of claim 3, wherein each node of the plurality of nodes is associated with a sentiment and a magnitude of the sentiment.

5. The method of claim 4, wherein the social health of the project is estimated based at least in part on the sentiment and the magnitude of the sentiment of the plurality of nodes of the set of social media conversations associated with the project.

6. The method of claim 1, wherein the social health of the project is calculated as a function of sub-tasks of the project.

7. The method of claim 1, wherein the social health of the project is calculated based at least in part on a content of the conversation.

8. The method of claim 1, wherein the social health of the project is calculated based at least in part on one or more metadata parameters associated with the conversation.

9. The method of claim 1, wherein the social health of the project is calculated based at least in part on a degree of influence of a contributor within the enterprise project management application.

10. A non-transitory computer readable medium having stored thereon a sequence of instructions which, when executed by a processor causes the processor to execute a method comprising:
    maintaining a first computing system that implements a first type of data object;
    maintaining a second computing system having a social networking application, the social networking application implementing a second type of data object, the second type of data object being different from the first type of data object, the second type of data object corresponding to social objects within the social networking application, wherein the social objects comprise a stream of messages regarding a specific one or more of the first type of data object;
    maintaining an intermediary system between the first computing system and the second computing system, the intermediary system mapping the first type of data object to the second type of data object;
    generating analytical data for the first type of data object at the first computing system by analyzing the second type of data object at the second computing system, the analytical data generated by:
        creating a social object of the second type of data object at the social networking application, wherein the social object of the second type of data object is mapped to the specific one or more of the first type of data object, the social object corresponding to a project associated with an enterprise project management application at the first computing system;
        tracking a set of social media conversations associated with the social object by identifying a quantity of the stream of messages that have been posted within the social networking application for the social object; and
        analyzing the quantity of the stream of messages that have been posted within the social networking application for the social object to determine the analytical data for the first type of data object at the first computing system, the analytical data corresponding to the set of social media conversations is used to estimate a social health of the project;
    displaying the analytical data in a user interface at the first computing system, the analytical data for the first type of data object at the first computing system being derived from the second type of data object from the second computing system, the analytical data providing the estimate of the social health of the project at the enterprise project management application;
    implementing the first computing system to comprise a management application, a database, a message queue, and a first API (applications programming interface), wherein the management application corresponds to the enterprise project management application, the database holding the first type of data object, the message queue holding updates to the analytical data, and the first API providing access to the first computing system for the intermediary system;
    implementing the intermediary system to integrate the first computing system with the second computing system, the intermediary system comprising a first database to hold mapping information that maps the first type of data object to the second type of data object, the intermediary system further comprising a second database to hold data from both the first computing system and the second computing system, wherein one or more hash values are maintained to track business data and social conversations;
    implementing a second computing entity to comprise a second API to make the second type of data object available to the intermediary system, wherein a unique identifier for a desired social object is passed to second API, the second computing entity further comprising an activity stream that allows users to create, participate and modify conversations about the social object; and
    configuring the social object to include one or more of (a) a set of programmatic rules defining behavior of integration between the first computing system and the second computing system; (b) a wall that displays posts from members and users of the social networking application; (c) a set of related conversations; (d) a membership of individuals and groups with access to the social object; or (e) a gadget that provides access and updates to the first computing system.

11. The computer readable medium of claim 10, wherein a process scheduler schedules one or more processes to determine the analytical data for the first type of data object, where multiple processes performs analysis in parallel for different ones of the first type of data object that are independent of one another.

12. The computer readable medium of claim 10, wherein the set of social media conversations are represented in a hierarchical format having a plurality of nodes, the plurality of nodes corresponding to the quantity of the stream of messages or replies to the set of social media conversations.

13. The computer readable medium of claim 12, wherein each node of the plurality of nodes is associated with a sentiment and a magnitude of the sentiment.

14. The computer readable medium of claim 10, wherein the social health of the project is calculated based at least in part on a degree of influence of a contributor within the enterprise project management application.

15. The computer readable medium of claim 10, wherein the social health of the project is calculated as a function of sub-tasks of the project.

16. A system, comprising:
a processor; and
a memory comprising computer code executed using the processor, in which execution of the computer code implements:
maintaining a first computing system that implements a first type of data object;
maintaining a second computing system having a social networking application, the social networking application implementing a second type of data object, the second type of data object being different from the first type of data object, the second type of data object corresponding to social objects within the social networking application, wherein the social objects comprise a stream of messages regarding a specific one or more of the first type of data object;
maintaining an intermediary system between the first computing system and the second computing system, the intermediary system mapping the first type of data object to the second type of data object;
generating analytical data for the first type of data object at the first computing system by analyzing the second type of data object at the second computing system, the analytical data generated by:
creating a social object of the second type of data object at the social networking application, wherein the social object of the second type of data object is mapped to the specific one or more of the first type of data object, the social object corresponding to a project associated with an enterprise project management application at the first computing system;
tracking a set of social media conversations associated with the social object by identifying a quantity of the stream of messages that have been posted within the social networking application for the social object; and
analyzing the quantity of the stream of messages that have been posted within the social networking application for the social object to determine the analytical data for the first type of data object at the first computing system, the analytical data corresponding to the set of social media conversations is used to estimate a social health of the project;
displaying the analytical data in a user interface at the first computing system, the analytical data for the first type of data object at the first computing system being derived from the second type of data object from the second computing system, the analytical data providing the estimate of the social health of the project at the enterprise project management application;
implementing the first computing system to comprise a management application, a database, a message queue, and a first API (applications programming interface), wherein the management application corresponds to the enterprise project management application, the database holding the first type of data object, the message queue holding updates to the analytical data, and the first API providing access to the first computing system for the intermediary system;
implementing the intermediary system to integrate the first computing system with the second computing system, the intermediary system comprising a first database to hold mapping information that maps the first type of data object to the second type of data object, the intermediary system further comprising a second database to hold data from both the first computing system and the second computing system, wherein one or more hash values are maintained to track business data and social conversations;
implementing a second computing entity to comprise a second API to make the second type of data object available to the intermediary system, wherein a unique identifier for a desired social object is passed to the second API, the second computing entity further comprising an activity stream that allows users to create, participate and modify conversations about the social object; and
configuring the social object to include one or more of (a) a set of programmatic rules defining behavior of integration between the first computing system and the second computing system; (b) a wall that displays posts from members and users of the social networking application; (c) a set of related conversations; (d) a membership of individuals and groups with access to the social object; or (e) a gadget that provides access and updates to the first computing system.

17. The system of claim 16, wherein a process scheduler schedules one or more processes to determine the analytical data for the first type of data object, where multiple processes performs analysis in parallel for different ones of the first type of data object that are independent of one another.

18. The system of claim 16, wherein the set of social media conversations are represented in a hierarchical format having a plurality of nodes, the plurality of nodes corresponding to the quantity of the stream of messages or replies to the set of social media conversations.

19. The system of claim 16, wherein the social health of the project is calculated based at least in part on a degree of influence of a contributor within the enterprise project management application.

* * * * *

UNITED STATES PATENT AND TRADEMARK OFFICE
CERTIFICATE OF CORRECTION

PATENT NO. : 10,223,659 B2  
APPLICATION NO. : 14/621159  
DATED : March 5, 2019  
INVENTOR(S) : Babar Page 1 of 1

It is certified that error appears in the above-identified patent and that said Letters Patent is hereby corrected as shown below:

On the Title Page

Column 1, Item (54) under Title, Line 1, delete "Methods" and insert -- Method --, therefor.

In the Specification

In Column 1, Line 1, delete "Methods" and insert -- Method --, therefor.

In Column 3, Line 65, delete "and or" and insert -- and/or --, therefor.

In Column 17, Line 32, delete "reshares+α" and insert -- reshares·α --, therefor.

In Column 20, Line 33, delete "PTSN," and insert -- PSTN, --, therefor.

In the Claims

In Column 23, Line 4, in Claim 1, delete "object" and insert -- object; --, therefor.

In Column 24, Line 41, in Claim 10, delete "to" and insert -- to the --, therefor.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*